United States Patent [19]

Münch

[11] Patent Number: 5,203,444
[45] Date of Patent: Apr. 20, 1993

[54] CONTAINER GROUPING APPARATUS

[75] Inventor: Karl Münch, Heppenheim, Fed. Rep. of Germany

[73] Assignee: Seitz Enzinger Noll Maschinenbau AG, Mannheim, Fed. Rep. of Germany

[21] Appl. No.: 794,737

[22] Filed: Nov. 15, 1991

[30] Foreign Application Priority Data

Nov. 15, 1990 [DE] Fed. Rep. of Germany ....... 4036341

[51] Int. Cl.$^5$ ............................................. B65G 47/26
[52] U.S. Cl. ............................... 198/418.7; 198/419.3; 198/732
[58] Field of Search .................. 198/418.7, 419.3, 426, 198/732, 461

[56] References Cited

U.S. PATENT DOCUMENTS

| 3,845,852 | 11/1974 | Langen et al. | 198/732 X |
| 3,929,220 | 12/1975 | Powel | 198/732 |
| 4,552,261 | 11/1985 | Raudat et al. | 198/419.3 |
| 4,637,509 | 1/1987 | Raudat et al. | 198/461 X |
| 4,832,178 | 5/1989 | Anderson et al. | 198/419.3 X |

FOREIGN PATENT DOCUMENTS 2711702 9/1978 Fed. Rep. of Germany.
3702954 8/1988 Fed. Rep. of Germany.

Primary Examiner—Joseph E. Valenza
Assistant Examiner—Tuan N. Nguyen
Attorney, Agent, or Firm—Robert W. Becker & Associates

[57] ABSTRACT

A grouping apparatus for separating from a stream of tightly packed containers that is being fed by a conveyor groups of containers. Provided on at least two continuously rotating belt or chain type drive elements are a plurality of grouping mechanisms having abutment and retaining surfaces for the containers. These surfaces are moved by the drive element along a continuous path of rotation and along a portion of this path of rotation that proceeds in a conveying direction of the conveyor extend into the path of movement of the containers. The spacing between the abutment and retaining surfaces of two successive grouping mechanisms is adjustable in conformity with the diameter of the containers. For this purpose, each grouping mechanism is pivotably secured to the drive elements and is provided with a guide arm that extends radially relative to the pivot axis and cooperates with a control member that for altering the spacing is pivotable relative to the drive element and is provided with a continuous control curve that is engaged by a slide piece or control roller with which the guide arm is provided at a radial distance from the pivot axis.

14 Claims, 3 Drawing Sheets

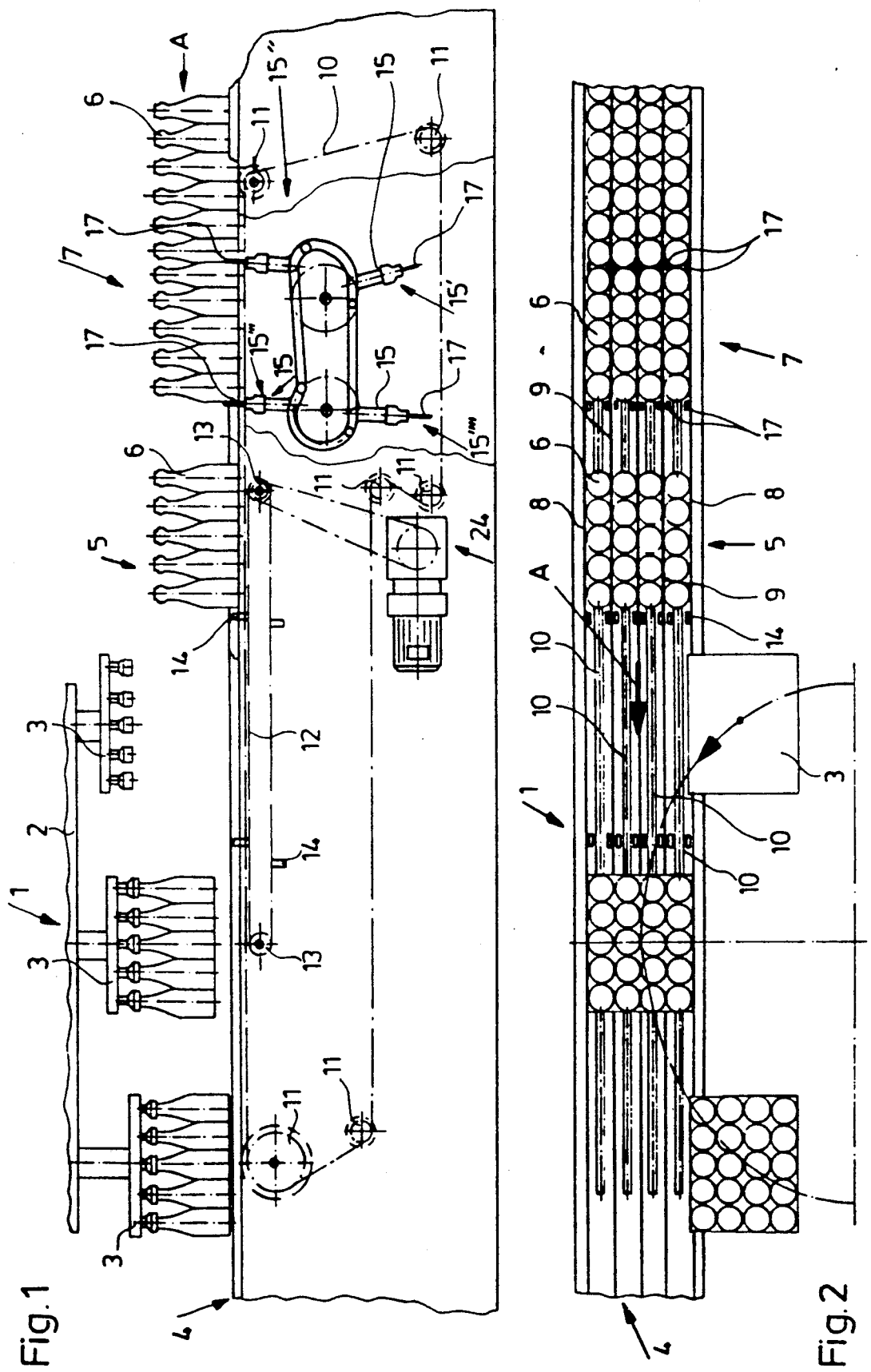

CONTAINER GROUPING APPARATUS

BACKGROUND OF THE INVENTION

The present invention relates to a grouping or arranging apparatus for providing groups of containers, with each group having a prescribed length and being formed by separating from a stream of containers that is being fed by a conveyor means a number of containers that corresponds to the group length.

A grouping apparatus of this general type is known from DE-OS 37 02 954. With this known grouping apparatus, where the movement of the grouping mechanisms in the desired manner is achieved on the one hand by the rotating drive means and on the other hand by a guide arm that cooperates with a control member, an adjustment or adaptation of the spacing (group length) to different container sizes is possible without difficulty. The grouping mechanisms are pivotably held on the drive means equidistantly from one another, and are controlled by the guide arm that cooperates with the control member in such a way that the dividing means, which are grouping fingers, have a respectively prescribed angular position relative to the conveying direction of the conveyor means, especially also at the beginning as well as the at the end of a portion of the path of rotation of the grouping mechanisms, i.e. in the region of the inlet and in the region of the outlet of the grouping apparatus. This angular position at the beginning and at the end of the portion of the path of rotation ultimately determines the spacing or group length. By altering the position of the control member relative to the drive means, this angular position and hence the spacing or group length can then be altered or adjusted, even though the grouping mechanisms are pivotably provided on the drive means at prescribed equal distances from one another. With the heretofore known grouping apparatus, the control member is also a rotationally driven belt or chain type member, thereby necessitating a not inconsiderable structural outlay.

Also known is a grouping apparatus (DE-OS 27 11 702) where a plurality of grouping mechanisms are provided that each have dividing means or grouping fingers, are embodied as carriages, and run via rollers in a common, closed guide means, and in particular in such a way that each carriage or grouping mechanism during a complete travel along the path of movement first moves out of a starting or feed position that is provided far below the transport plane of a conveyor means upwardly along a circular portion of the movement path to the inlet of the grouping apparatus, then along an essentially horizontal portion of the movement path in the conveying direction of the conveying means to the outlet of the grouping apparatus, then downwardly along a further circular portion of the movement path, and finally back to the starting or feed position along an essentially horizontally portion of the movement path in a direction counter to the conveying direction of the conveyor means. The guide means for the grouping mechanisms is formed from two respectively closed curve means that are provided at a distance from and parallel to one another and are fixed on a frame of the machine. Each grouping mechanism is guided in each curve means via two rollers. In addition to the guide means, with this known grouping apparatus there is also provided a drawing or drive element for moving the grouping mechanisms, and in particular in the form of a costed, continuously rotating driven chain. The grouping mechanisms as well as this chain are embodied in such a way that the grouping mechanisms that are available at the starting or feed position can be successively positively connected with a chain via a coupling means that is provided at that location, so that the grouping mechanisms, which after such a connection are respectively carried along by the chain, have during their movement between the inlet and the outlet of the grouping apparatus a spacing from one another that corresponds to the required group length. By means of an uncoupling device, the grouping mechanisms are again disengaged from the drive means in the vicinity of the outlet, and are returned to the starting position, where a certain number of grouping mechanisms that are not engaging the drive means are available.

With this heretofore known grouping apparatus, where the grouping mechanisms are not continually connected with the drive means, and where the grouping mechanisms are therefore not uniformly spaced from one another, with the grouping mechanisms being disposed one right after the other at the starting position and not having a spacing that corresponds to the group length, although an adjustment of this group length is also possible, this can be accomplished only with a very significant structural outlay. An alteration of the group length by changing the angular position that the dividing means or grouping fingers respectively have at the inlet or outlet is not provided with this known grouping apparatus. Rather, at that location the dividing means or grouping fingers that, regardless of the respective group length at the inlet and the outlet, respectively have the same angular position relative to the conveying direction of the conveying means.

It is therefore an object of the present invention to provide a grouping apparatus of the aforementioned general type that has a simpler construction.

BRIEF DESCRIPTION OF THE DRAWINGS

This object, and other objects and advantages of the present invention, will appear more clearly from the following specification in conjunction with the accompanying schematic drawings, in which:

FIG. 1 is a simplified side view of a portion of a bottle handling unit comprised o f one exemplary embodiment of the inventive grouping apparatus as well as a packing means that follows the grouping apparatus;

FIG. 2 is a plan view of the portion of the bottle handling machine shown in FIG. 1;

SUMMARY OF THE INVENTION

Figure 3:
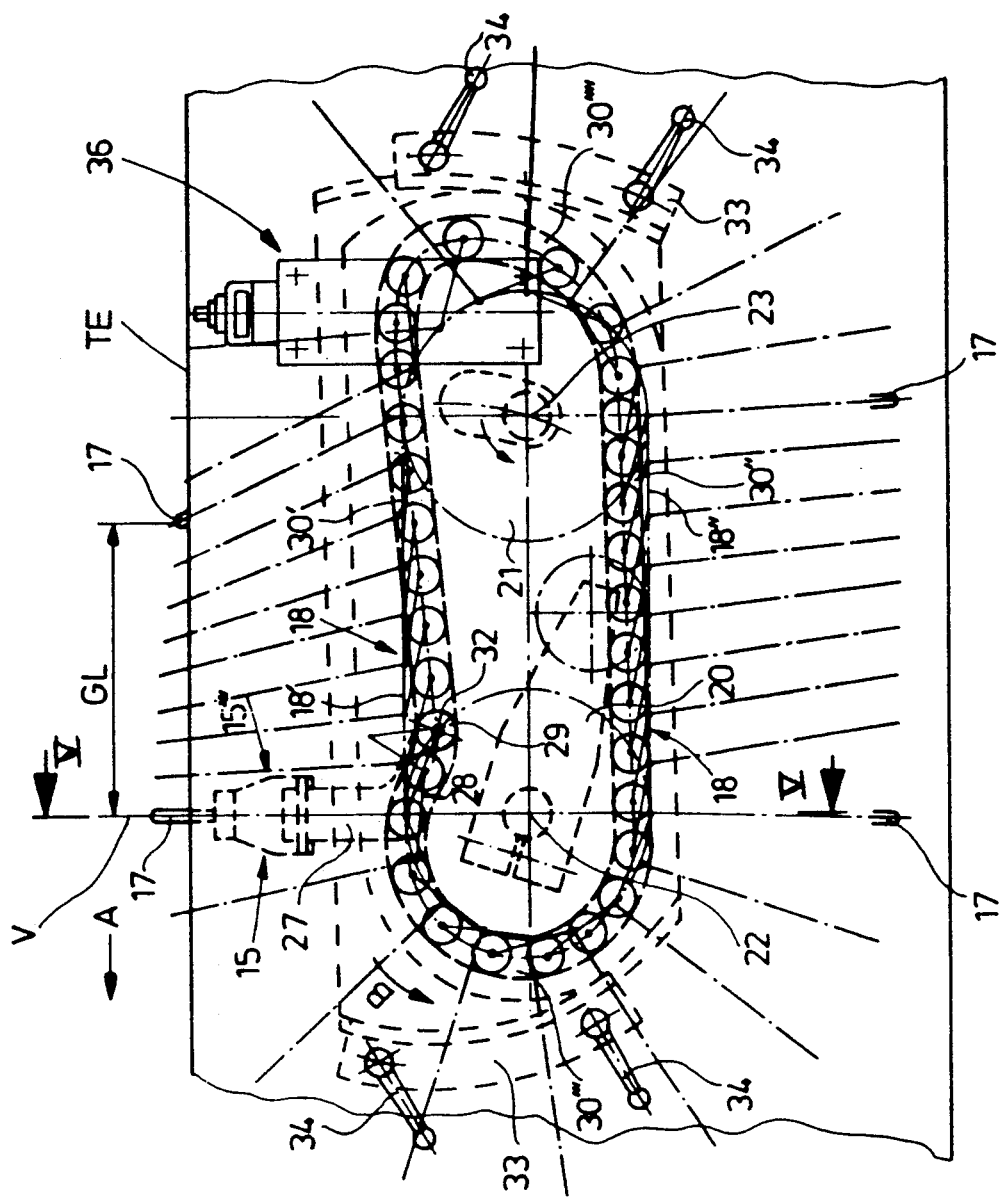
FIG. 3 is an enlarged side view of the inventive grouping apparatus in a first setting or position of the control member that corresponds to a minimum group length.

The grouping apparatus of the present invention comprises: at least two continuously rotating belt or chain type drive means, each of which forms a loop; grouping or arranging mechanisms having dividing means or grouping fingers that form a plurality of abutment and retaining surfaces for the containers, with the grouping mechanisms being provided on the drive means and the surfaces thereof being moved in a direction of rotation of the drive means along a continuous path of rotation, wherein along a portion of this path of rotation that proceeds in the conveying direction of the conveyor means, the surfaces of the grouping mechanisms extend into a path of movement of the containers on the conveyor means, while along the remainder of the path of rotation the surfaces of the grouping mechanisms are beyond this path of movement of the containers, with the grouping mechanisms being mounted on the drive means equidistantly from one another in such a way as to be pivotable about a pivot axis that extends perpendicular to the direction of rotation of the drive means, and wherein the surfaces of the grouping mechanisms are radially spaced from this pivot axis; a control member that is pivotably mounted on the grouping apparatus, for example on a machine frame of the apparatus or of a portion of the conveyor means that forms this apparatus, for adjusting the position of the control member relative to the drive means for adjusting the group length by adjusting the spacing between successive runs of the surfaces of the grouping mechanisms along the portion of the path of rotation by altering the angular position which the dividing means or grouping fingers respectively form with the conveying direction of the conveyor means at a beginning and end of that portion of the path of rotation, with a pivot axis of the control member extending perpendicular to a plane in which the loop formed by the drive means is disposed, and with the control member having at least one continuous control curve means, which is disposed in a plane that extends parallel to the plane of the loop of the drive means; and guide arms, each one of which is rigidly connected to a respective grouping mechanism and extends radially relative to the pivot axis, with each guide arm engaging the control curve means of the control member via at least one guide means.

With the inventive grouping apparatus, to move the grouping mechanisms merely the belt or chain type drive means is provided, which pursuant to one preferred specific embodiment of the present invention is formed by at least two closed or continuous chains, the loops of which are disposed in parallel planes, while the control member is provided with a straightforward, continuous control curve means that is engaged by the respective guide arm via at least one slide means or guide roller. Thus, with the inventive grouping apparatus it is not necessary to have a structurally relatively complicated control member that comprises a chain, at least two chain sprockets, a drive means for one of the two sprockets, etc.

Further specific features of the present invention will be described in detail subsequently.

DESCRIPTION OF PREFERRED EMBODIMENTS

Referring now to the drawings in detail, FIG. 1 shows a conventional packing means 1 that, on a rotor 2 that is rotatable about a vertical axis, is provided with a plurality of packing heads 3 that are respectively rotatable about the vertical axis and can each be raised and lowered in a vertical direction. Each of the packing heads 3 can remove from the conveyor means 4, and then place in non-illustrated transport packaging means (bottle cases), a group 5 of bottles 6 that are conveyed on the means 4. As shown in FIG. 2, in the illustrated embodiment each bottle group 5 consists of a total of 20 bottles 6, which are arranged in four rows that each contain five bottles 6

In the embodiment illustrated in FIGS. 1 and 2, the bottles 6 are supplied from the right (arrow A) in an upright position by the conveyor means 4 or a further, preceding conveyor means in a closely arranged stream of bottles comprising four rows. In the region of a grouping or arranging apparatus 7 that is disposed upstream of the packing means 1, the stream of bottles is divided into the bottle groups 5 that are then respectively supplied as such one after the other in a separated manner to the packing means 1. To convey the bottles 6, i.e. the bottle groups 5, in the region of the grouping apparatus 7 as well as to convey the bottles from this apparatus to the packing means 1, four transport or feed paths are provided that are disposed parallel to one another and are each delimited outwardly or are separated from one another by lateral guide means 8 or 9 that are formed, for example, by guide plates. Each of the feed paths is provided with a continuously rotating conveying element in the form of a hinged band chain 10, each of which is guided about a number of guide rollers or wheels 11, one of which is driven by a drive means, in such a way that the respectively upper run of each hinged band chain 10 operates in a horizontal direction and in the conveying direction A and, in a horizontal transport plane TE of the conveyor means 4, forms a support surface for the bases of the upright bottles 6.

In order to adapt in particular the movement of the bottle groups 5 from the grouping apparatus 7 to the packing means 1 to the operating cycle of the latter, provided in the region between the grouping apparatus 7 and the packing means 1, in addition to the conveying means formed by the hinged band chains 10, are a plurality of continuously rotating auxiliary chains 12 that are disposed parallel to one another. Each auxiliary chain 12 is guided over two chain or sprocket wheels 13 in such a way that its upper run is disposed parallel to the upper runs of the hinged band chains 10. In particular, the arrangement is such that on both longitudinal sides of the upper run of each hinged band chain 10, there is provided the slightly lower upper run of a respective auxiliary chain 12. Each auxiliary chain is provided at prescribed intervals with engagement dogs or projections 14 that at the respectively upper run of the auxiliary chain 12 extend from below through a gap formed between the pertaining hinged band chain 10 and the lateral guide means 8 or 9 and beyond the transport plane TE formed by the upper run of the pertaining hinged band chain 10. Thus, the engagement projections 14 form abutment surfaces for the forward or downstream bottle 6 of the respective bottle group 5 as viewed in the direction of transport A. Since the auxiliary chains 12 are driven by the respective sprocket wheel 13, the right one in FIG. 1, in such a way that their upper runs move in the transport direction A, but the speed of the auxiliary chains 12 is less than the speed of the hinged band chains 10, the downstream bottle 6 of each bottle group 5 (after separation of this bottle group in the grouping apparatus 7) abuts against the engagement projections 14. The pertaining bottle group 5, while maintaining its formation, is then transported to the packing means 1 at a reduced speed that corresponds to the rotational speed of the auxiliary chains 12. In this connection, the drive means for the auxiliary chains 12 is adapted to the operating cycle of the grouping apparatus 7 in such a way that whenever a bottle group 5 leaves the grouping apparatus 7, engagement projections 14 are disposed downstream of this bottle group when viewed in the direction of transport. This bottle group 5 can then come to rest against the engagement projections 14 prior to reaching the packing means 1, but only after a conveying path length that is adequate for the separation of successive bottles 6, i.e. bottle groups 5.

In the illustrated embodiment, the grouping apparatus 7 has four grouping or arranging mechanisms 15. Each grouping mechanism is formed by a bar 16, the length of which is disposed in the horizontal direction and perpendicular to the transport direction A. On one long side the bar 16 carries a plurality of grouping fingers 17 that project beyond this side. With the aid of a drive means that will be described subsequently, the grouping mechanisms are moved along a continuous path in such a way that at the inlet of the grouping apparatus 7, each grouping mechanism 15 is initially moved out of a starting position 15', in which it is lowered relative to the transport plane TE, and into a raised position indicated by the reference numeral 15". In the position 15', the grouping fingers 17 are disposed far below the transport plane TE, and when they reach the position 15", the free ends thereof extend beyond the transport plane TE and are thus effective as abutment surfaces that cooperate with the bottle 6. The number of grouping fingers 17 and their paired arrangement on the bars 16 are, for each grouping mechanism 15, selected in such a way that after the position 15" has been reached, one grouping finger 17 of a pair of grouping fingers projects upwardly beyond the transport plane TE on each long side of each hinged band chain 10, as can be seen in particular from FIG. 5. It is to be understood that the distance between the grouping fingers 17 of a pair of grouping fingers is less than the outer diameter of the bottles 6.

After the position 15', with the grouping fingers 17 projecting upwardly far beyond the transport plane TE, each grouping mechanism 15 is moved in the horizontal direction and hence in the conveying direction A until the pertaining grouping mechanism 15 has reached the position 15''' at the outlet of the grouping apparatus 7. Each grouping mechanism 15 is subsequently lowered, whereby the grouping fingers 17 are moved downwardly out of the path of movement of the bottles 6. As soon as the pertaining grouping mechanism 15 has reached the position 15'''', in which the grouping fingers are disposed far below the transport plane TE this grouping mechanism 15 is moved essentially in a horizontal direction and counter to the conveying direction A back to the position 15'.

The number of grouping mechanisms 15 relative to the overall length of the aforementioned path of movement is such that at any given time, at least one grouping mechanism 15 is disposed between the positions 15" and 15''', so that especially when one grouping mechanism has assumed the position 15''', a subsequent grouping mechanism 15 has assumed the position 15". Furthermore, the speed with which the grouping mechanisms 15 rotate in the aforementioned manner, i.e. move from the position 15" to the position 15''', is less than the conveying speed of the hinged band chains 10. As a consequence, after each grouping mechanism 15, i.e. the grouping fingers 17 thereof, have left the position 15''', the following bottles 6 of the rows of bottles, which rest directly against one another, are retained against the greater conveying speed of the hinged band chains 10 and, in conformity with the lower speed of the pertaining grouping mechanism 15, are moved more slowly in a direction from the inlet of the grouping apparatus 7 toward the outlet thereof.

As soon as a grouping mechanism 15 that retains the bottles 6 has reached the position 15''' at the outlet of the grouping apparatus 7, and hence in each row of the stream of bottles a number of bottles 6 that corresponds to the bottle group 5 that is to be separated off is contained between the inlet and the outlet of the grouping apparatus 7, and in any case before this grouping mechanism 15 has left the position 15''' and its grouping fingers 17 have released the retained bottles 6, the grouping fingers 17 of a subsequent grouping mechanism 15 have, at the position 15", i.e. at the inlet of the grouping apparatus 7, already moved into position between the last bottles 6 of the bottle group 5 that is to be separated off and the following bottles 6, and in particular respectively on both sides of the region at which these bottles still rest against one another. Subsequently, due to the lowering of the leading grouping mechanism 15 that is leaving the position 15''', the bottles 6 that form the bottle group 5 that is to be separated off are released and are conveyed away as the bottle group 5 at greater speed via the hinged band chains 10. The bottles 6 that follow this bottle group 5 then rest against the grouping fingers 17 of the following grouping mechanism 15 that is then moving from the position 15" to the position 15''', with these bottles being moved at a slower speed by these gripping fingers to the outlet, where they are released after a further following grouping mechanism 15 has reached the position 15".

Thus, as described above, the tightly packed stream of bottles that is disposed at the inlet of the grouping apparatus 7 is split into individual groups 5. In order for the grouping apparatus 7 to function satisfactorily, it is necessary that the effective spacing or distance that the grouping fingers 17 of two grouping mechanisms 15 that are disposed in the positions 15" and 15''' have from one another in the conveying direction A is slightly less than the sum of the diameters of the bottles 6 that are disposed in each row of the group 5, i.e. in the illustrated embodiment is slightly less than 5 times the diameter of the bottles 6.

Especially when bottles 6 having different diameters are to be processed with one and the same grouping apparatus 7, an adjustment or adaptation of the aforementioned spacing or the group length GL is necessary. With the grouping apparatus 7, this adjustment can be effected in a particularly straightforward manner with the aid of the drive means that effects rotation of the grouping mechanisms 15.

Figure 6:
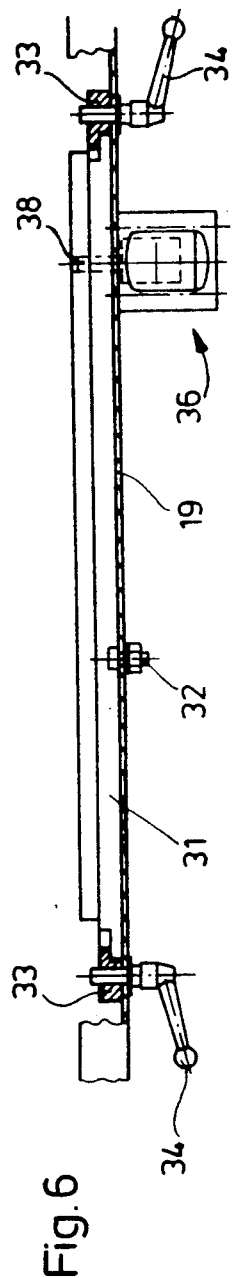
FIG. 6 is a partial horizontal cross-sectional view of a side wall of the grouping apparatus together with the control member that is adjustably provided on this side wall.
Figure 7:
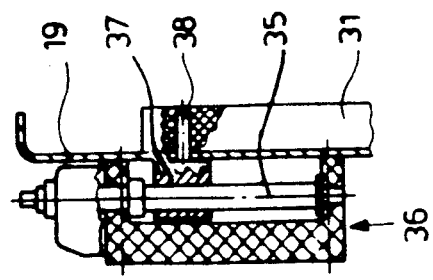
FIG. 7 illustrates an adjustment mechanism for adjusting the control member.

This drive means comprises two drive mechanisms for the grouping mechanisms 15, with each drive mechanism being formed from a closed and continuously rotating chain 18. In this connection, each chain 18 is provided in the interior of a housing on one long side of the grouping apparatus 7, i.e. on a long side of that portion of the conveyor means 4 formed thereby. In the drawing, and in particular in FIGS. 5-7, only one side wall 19 of this housing is shown, with this wall extending in a vertical direction. Each chain 18 is guided over two chain or sprocket wheels 20 and 21 in such a way that it has an upper, horizontal run 18' that moves in the conveying direction, and a lower, similarly horizontal run 18' that, however, moves counter to the conveying direction A. Both runs 18' and 18" are disposed below the transport plane that is formed by the hinged band chains 10, and together with the runs that are respectively guided over the sprocket wheels 20 and 21 are disposed in a vertical plane. The sprocket wheels 20 and 21 are respectively rotatably mounted in pairs about a common horizontal axis that extends perpendicular to the conveying direction A, with the two sprocket wheels 20 being mounted on a shaft 22 and the two sprocket wheels 21 being mounted on a shaft 23; the shaft 22 is driven by a drive means 24 that has a drive motor and that in the illustrated embodiment also serves to drive the auxiliary chain 12.

Each of the two chains 18 has the same length. In conformity therewith, the two sprocket wheels 20 and the two sprocket wheels 21 are in each case also identical. In the illustrated embodiment, the sprocket wheels 20 and 21 have the same diameter.

Figure 5:
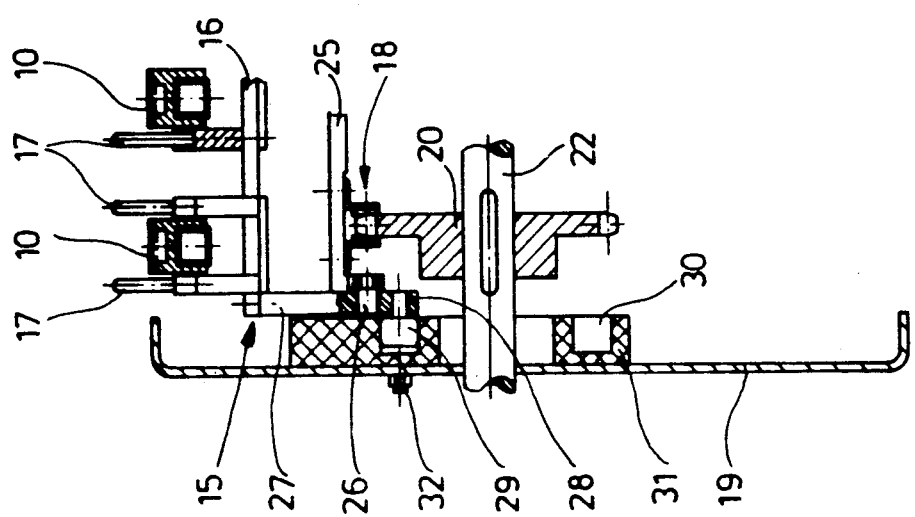
FIG. 5 is a cross-sectional view taken along the line V—V in FIG. 3.

As can be seen from FIG. 5, the two chains 18, at least in the vicinity of a grouping mechanism 15, are interconnected by an additional bar 25, the lengthwise dimension of which extends parallel to the axis of the shaft 22 or 23. The ends of each bar 25 extends beyond the outer sides of the adjacent chain 18 that face the respective long side of the grouping apparatus 7. Provided at each end of the bar 25 is a rigid auxiliary or helper arm 27 of the respective grouping mechanism 15 that, via a pivot bolt 26, is pivotable about an axis that extends parallel to the axis of the shafts 22 and 23, with the pivot bolts 26 at the two ends of a bar 25 being aligned with one another. The bars 25, and hence also the pivot bolts 26, are respectively distributed and secured to the chains 18 so as to be equidistantly spaced from one another; thus, the grouping mechanisms 15 are pivotably held on the chains 18 in such a way as to be spaced equidistantly from one another. That end of each helper arm 27 that is remote from the pivot bolt 26 and that during rotation of the chains 18, and hence the grouping mechanisms 15, in the direction of rotation B is directed upwardly between the positions 15" and 15'" and is directly downwardly between the positions 15"" and 15', is rigidly connected with a respective end of the bar 16. The lengthwise extension of each helper arm 27 is disposed in a vertical plane.

On one long side of the grouping apparatus, i.e. in the region of a chain 18, the helper arms 27 that are disposed there are respectively provided with a control or guide arm 28, the lengthwise dimension of which extends approximately radially away from the pivot bolt 26 and is disposed in a common vertical plane with the lengthwise extension of the pertaining helper arm 27, and in particular in such a way that the lengthwise dimension of the helper arm 27 and the lengthwise dimension of the control arm 28 form an angle with one another, preferably an angle of greater than 90°. In the illustrated embodiment, this angle is approximately 120°. In addition, the guide arm 28 is disposed on the pertaining helper arm 27 in such a way that during rotation of the grouping mechanisms 15, i.e. the chains 18, that end of the respective guide arm 28 that is remote from the pivot bolt 26 is a follower. At this follower end, each of the guide arms 28 is provided with a curve or guide roller 29 that is mounted in such a way as to be freely rotatable about an axis that is parallel to the axes of the shafts 22 an 23. This guide roller 29 laterally engages a continuous control curve means 30 that is disposed in a plane that is parallel to the plane in which is disposed the loop formed by the adjacent chain 18. In the illustrated embodiment, the control curve means 30 is a continuous groove that is formed on an essentially plate-like control member 31.

The control member 31 is provided on the inside of the side wall 19 of the appropriate long side of the grouping apparatus 7; when viewed from this long side, the control member 31 is disposed before the rotational path of the helper arm 27. To permit engagement of the guide rollers 29 in the control curve means 30, that side of the latter facing the path of movement of the helper arm 27 is open.

To set the spacing or group length GL, the control member 31, and hence also the control curve means 30, are pivotably adjustable about a horizontal axis that extends at right angles to the transport direction A, i.e. extends parallel to the axes of the shafts 22 and 23. For this purpose, the control member 31 is secured to the housing, i.e. to the side wall 19, via a pivot bolt 32. Two shims or similar holding pieces 33, with pertaining clamping screws or elements 34, are provided to fix the position of the respective setting of the control member 31. For the setting of the control member 31, there is furthermore provided on the outer side of the housing, i.e. on the side wall 19 of the grouping apparatus 7, an adjustment mechanism 36 that has a threaded spindle 35. Seated on this threaded spindle is a block 37 that is guided in the longitudinal direction of this spindle and, via a pin 38, pivots the control member 31 about the axis of the pivot bolt 32 when the threaded spindle 35 is rotated.

Figure 4:
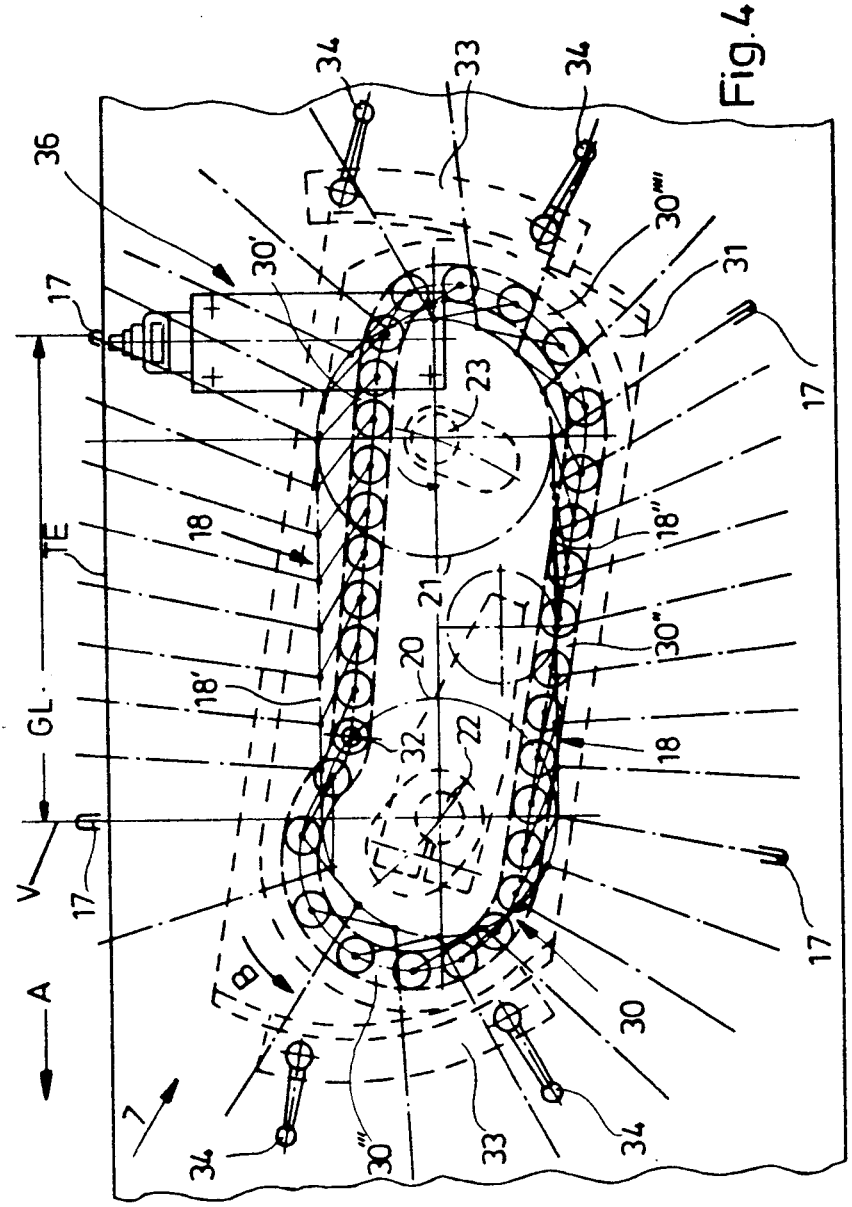
FIG. 4 is a view similar to FIG. 3, but with the control member having a setting or position that corresponds to a maximum group length.

As shown in FIGS. 3 and 4, the control curve means 30 has a path comprised of many portions, namely the two essentially linear portions 30' and 30", with the portion 30' being disposed above the portion 30" in the region of the chain run 18' and the portion 30" being disposed below the portion 30' in the region of the chain run 18", as well as the two curved portions 30'" and 30"" that interconnect the two portions 30' and 30", with the essentially circular arc-shaped portion 30'" interconnecting the portions 30' and 30" in the region of the positions 15'" and 15"", while the portion 30"" interconnects the portions 30" and 30' in the region of the positions 15' and 15". Starting from the portion 30", the portion 30"" initially has a greater radius of curvature, while in the transition zone to the portion 30' it has a considerably smaller radius of curvature.

In addition, the path of the control curve means 30 is such that with the embodiment illustrated in FIGS. 3 and 4, not only the portion 30'" but also the portion 30"" of the control curve means 30 extend beyond the loop formed by the adjacent chain 18 in the direction of transport A and counter to this direction respectively. The center line of the control curve means 30, which corresponds to that line along which the axis of the guide roller 29 is moved during rotation of the respective grouping mechanism 15, intersects the projection of the chain 18 onto the plane of the control curve means 30 several times, and in particular with both of the settings of the control member 31 shown in FIGS. 3 and 4 two times in the region of the portion 30'", where also at least in one area the center line of the control curve means 30 surrounds the projection of the chain 18 on the outside. In addition, the projection of the chain onto the plane of the control curve means 30 intersects the center line of the control curve means two further times, and in particular with the setting of the control member 31 pursuant to FIG. 3, and relative to the direction of rotation B, at the beginning of the portion 30'''' and at the beginning of the portion 30', while with the setting of the control member 31 shown in FIG. 4 and again relative to the direction of rotation B, at the end of the portion 30'' and at the end of the portion 30'''. With both settings, the center line of the control curve means 30 in the region of the portions 30' and 30'' furthermore extends at least in part within the projection of the chain 18.

The axis of the pivot bolt 32, via which the control member 31 is adjustably, i.e. pivotably, disposed on the side wall 19, intersects the center line of the control curve means 30, and in particular at the transition zone between the portions 30' and 30''', whereby in both settings of the control member 31 (FIGS. 3 and 4), the control curve means 30, i.e. the center line thereof, starting from this transition zone extends upwardly at an angle, and in particular at an angle having an imaginary vertical axis V. The angle is the same or substantially the same as the angle that the lengthwise dimensions of the helper arm 27 and the guide arm 28 form with one another.

As a consequence of the guide rollers 29 that engage in the control curve means 30, for each grouping mechanism 15, during rotation of the chains 18, a pivot or control movement is achieved with which at the position 15''', i.e. at the outlet of the grouping apparatus 7, the grouping mechanisms 15 have essentially the same orientation regardless of the setting of the control member 31, whereas the orientation of the grouping mechanisms 15 at the inlet of the grouping apparatus 7 is a function of the setting of the control member 31. Thus, with the setting shown in FIG. 3, in which the center line of the control curve means 30 at the end of the portion 30'' and at the beginning of the portion 30' is disposed at approximately the same level as the projection of the upper run 18' of the chain 18, the grouping fingers 17 at the inlet of the grouping apparatus 7 are moved upwardly beyond the transport plane TE only relatively late, resulting in a small group length GL.

With the setting shown in FIG. 4, where the center line of the control curve means 30 at the end of the portion 30'''' as well as over the entire length of the portion 30' extends below the projection of the upper run 18' of the chain 18, at the inlet of the grouping apparatus 7 the grouping fingers 17 are moved upwardly early beyond the upper side of the transport plane TE, resulting in a large group length GL.

The present invention is, of course, in no way restricted to the specific disclosure of the specification and drawings, but also encompasses any modifications within the scope of the appended claims.

What I claim is:

1. A grouping apparatus for providing groups of containers, with each of said groups having a prescribed length and being formed by separating from a stream of containers that is being fed by a conveyor means a number of containers that corresponds to said group length, comprising:

at least two continuously rotating belt or chain type drive means, each of which forms a loop;

grouping mechanisms having dividing means or grouping fingers that form a plurality of abutment and retaining surfaces for said containers, with said grouping mechanisms being provided on said drive means, and said abutment and retaining surfaces thereof being moved in a direction of rotation of said drive means along a continuous path of rotation, wherein along a portion of said path of rotation that proceeds in a conveying direction of said conveyor means, said surfaces of said grouping mechanism extend into a path of movement of said containers on said conveyor means, while along the remainder of said path of rotation said surfaces of said grouping mechanisms are outside said path of movement of said containers, with said grouping mechanisms being mounted on said drive means equidistantly from one another in such a way as to be pivotable about a pivot axis that extends perpendicular to said direction of rotation of said drive means, wherein said surfaces of said grouping mechanisms are radially spaced from said pivot axis;

a control member that is pivotably mounted on said grouping apparatus for adjusting the position of said control member relative to said drive means for adjusting said group length by adjusting the spacing between successive ones of said surfaces of said grouping mechanisms along said portion of said path of rotation by altering the angular position which said dividing means or grouping fingers respectively form with said conveying direction of said conveyor means at a beginning and end of said portion of said path of rotation, with a pivot axis of said control member extending perpendicular to a plane in which said loops formed by said drive means is disposed, and with said control member having at least one continuous control curve means, which is disposed in a plane that extends parallel to said plane of said loop of said drive means; and guide arms, each one of which is rigidly connected to a respective grouping mechanism and extends radially relative to said pivot axis of said grouping mechanism, with each of said guide arms engaging said control curve means of said control member via at least one guide means, which follows said pivot axis of the pertaining grouping mechanism when viewed in said direction of rotation of said drive means, and wherein a center line of said control curve means is intersected at least two times, and preferably four times, by a projection of said loop of said drive means onto said plane of said control curve means, and in particular in conformity with at least one of the following: two times in the region of a container inlet of said grouping apparatus and two times in the region of a container outlet of said grouping apparatus.

2. A grouping apparatus according to claim 1, in which said pivot axis of said control member intersects a center line of said control curve means.

3. A grouping apparatus according to claim 1, which includes at least one of the following: an adjustment mechanism having a threaded spindle, and means for fixing the position of said control member.

4. A grouping apparatus according to claim 1, in which said control member is an essentially plate-shaped element.

5. A grouping apparatus according to claim 1, in which said center line of said control curve means at least partially surrounds said projection of said loop of said drive means in the region of at least one of the following: said container inlet and said container outlet of said grouping apparatus.

6. A grouping apparatus according to claim 5, in which said center line of said control curve means has a respective curved portion in both said region of said container inlet and said region of said container outlet.

7. A grouping apparatus according to claim 6, in which said curved portion in the region of said container outlet is essentially circular.

8. A grouping apparatus according to claim 6, in which, when viewed in said direction of rotation of said drive means, said pivot axis of said control member is disposed at approximately a beginning of said curved portion of said center line of said control curve means in the region of said container outlet.

9. A grouping apparatus according to claim 6, in which said loop formed by said drive means, as well as said control curve means, are each disposed in a vertical plane that extends parallel to said conveying direction of said conveyor means.

10. A grouping apparatus according to claim 9, in which both said drive means and said control curve means are disposed below a horizontal transport plane of said conveyor means, whereby at one end of said portion of said path of rotation said abutment and retaining surfaces of said dividing means or grouping fingers move from below into said path of movement of said containers, while at an opposite end of said portion of said path of rotation said surfaces move downwardly out of said path of movement of said containers.

11. A grouping apparatus according to claim 1, in which said drive means comprises at least two closed chains, each of which is guided over at least two rollers or wheels.

12. A grouping apparatus according to claim 1, in which said at least one control curve means of said control member is disposed in a plane that is disposed laterally of said path of rotation of said grouping mechanisms.

13. A grouping apparatus according to claim 1, in which said control member is adjustably disposed on a side wall of said grouping apparatus.

14. A grouping apparatus according to claim 1, in which said control member is adjustably disposed on a side wall of a portion of said conveyor means that forms said grouping apparatus.

* * * * *